United States Patent Office 3,542,537
Patented Nov. 24, 1970

3,542,537
NITRIFICATION INHIBITING FERTILIZER
COMPOSITION
Roger Gordon Hanson, West Lafayette, Ind., assignor to American Cyanamid Company, Stamford, Conn., a corporation of Maine
No Drawing. Filed Sept. 28, 1966, Ser. No. 582,485
Int. Cl. A01n 7/00
U.S. Cl. 71—1
12 Claims

ABSTRACT OF THE DISCLOSURE

A fertilizer composition for the control of soil nitrification contains a nitrogen delivering compound and a soil treatment nitrification inhibiting agent. The nitrogen delivering compound is an organic or inorganic nitrogen compound. The nitrification inhibiting agent is a 6-trihalomethyl-s-triazine compound.

---

The present invention relates to novel compositions and to a method for treating soil to suppress the nitrification of ammonium nitrogen therein to the nitrate form, which is readily lost from the soil through leaching or biological denitrification. More particularly, the invention relates to a method for treating ammoniacal nitrogen-containing fertilizers either per se or as applied to soils with a 6-trihalomethyl-s-triazine compound represented by the formula:

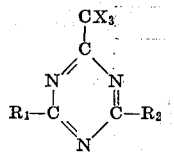

wherein X is a halogen, such as fluoro, chloro, bromo or iodo, and $R_1$ and $R_2$ each represents hydrogen, amino, hydroxy, halogen, lower alkoxy, lower alkyl or trihalomethyl, and to compositions containing the same, whereby a marked improvement in the supply of soil nitrogen necessary for proper plant growth is attained.

A major difficulty which is encountered in raising plant crops involves the provision for supplying an adequate amount of nitrogen in a utilizable form to the root system of such plants. Heretofore, a great deal of work has been done to ascertain the nitrogen needs of most commercial plant crops in various stages of growth and to determine the many factors which affect the supply of utilizable nitrogen in the soil. Further, substantial effort has been directed toward the development of an understanding of the complex mechanisms involved in the numerous nitrogen transformations which occur in soil during the entire growing period of a crop. In this connection, it has been found that the loss of nitrogen through nitrification can amount to several pounds per acre per week in sandy soil, silt, or clay loams having a pH of about 4.5 to 8 and soil temperatures at about 50° F. More importantly, these losses may double, triple, or even quadruple as the temperature rises. Thus, it is evident that nitrification and the resultant loss of soil nitrogen through such mechanism must be suppressed, if soil nitrogen is to be conserved and efficient use of the soil nitrogen present or added as fertilizer is to be achieved. Further, it has been established that a corn crop, illustratively, absorbs more than half its total soil nitrogen during the third month of growth. Thus, the nitrogen needs involved in growing corn are substantial, not only in the early stages of growth, but especially later in the season, during seed forming and maturation. However, a wholly satisfactory method for suppressing or inhibiting nitrification throughout the entire growing period has not been previously described. If one such method can be provided, a long felt need would be fulfilled.

It is, therefore, a principal object of this invention to provide a method for suppressing or delaying soil nitrification. It is a further object of the invention to provide a composition which supplies the normal nitrogen requirements of crops throughout the entire growing period, but simultaneously conserves the soil nitrogen. Other objects and advantages will become apparent from a consideration of the ensuing description.

To this end, soil nitrification is unexpectedly reduced in a straightforward manner by providing for the application to an ammonium nitrogen fertilized soil an effective amount of a 6-trihalomethyl-s-triazine compound of the formula:

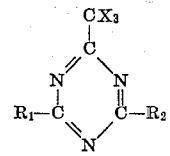

wherein X is halogen and $R_1$ and $R_2$ each represents hydrogen, hydroxy, halogen, (lower) alkoxy, (lower) alkyl, trihalomethyl or amino, said halogen being fluoro, chloro, bromo or iodo.

Illustrative 6-trihalomethyl-s-triazine compounds are, for instance: 2,4-diamino-6-trichloromethyl-s-triazine, 2-amino - 4,6 - bis(trichloromethyl)-s-triazine, 2,4,6-tris-trichloromethyl - s - triazine and 2-methyl-4,6-bis(trichloromethyl)-s-triazine. Each of the specifically mentioned 6-trihalomethyl-s-triazines is well known.

In accordance with the process of the invention, the application of a 6-trihalomethyl-s-triazine compound as a nitrification inhibitor may be made as a liquid or as a solid applied directly to the soil. Alternatively, the inhibitor may also be applied as a coating on a suitable fertilizer, or admixed with that fertilizer, or even applied separately but simultaneously with a fertilizer. In general, the 6-trihalomethyl-s-triazine inhibitor is particularly useful when applied with fertilizers containing from about 2.0 to 82.0% nitrogen. Such fertilizers are, for instance, animal manures, urea, anhydrous ammonia, ammonium salts, such as ammonium nitrate, ammonium phosphate, or ammonium sulfate, and equivalents thereof.

The quantity of inhibitor employed has been found to be of critical moment. It does, however, vary widely depending on such factors as the type of soil, weather conditions, time of application, amount of fertilizer applied and crops involved. It is important, therefore, to apply an amount of 6-trihalomethyl-s-triazine compound in an amount sufficient to suppress nitrification, but insufficient to provide toxicity to plants. Usually, a good practice is to add from about 0.5 to about 10 pounds of the hereinabove defined 6-trihalomethyl-s-triazine compound, or a mixture of such compounds, to an acre of crop land.

For application as a liquid, the 6-trihalomethyl-s-triazine soil nitrification inhibitors of the invention may be dissolved in an organic solvent, such as chloroform, benzene, isopropanol or acetonitrile and is applied as such or dispersed in water and then applied. Other additives, such as dispersants or emulsifiers may also be employed. Alternatively, the 6-trihalomethyl-s-triazine inhibitors can be utilized in a finely ground solid state with or without the addition of solid diluents or carriers, such as finely-divided clays, i.e., attapulgite, bentanite, kaolinite, diatomaceous earth, ground corn cobs, talc, and fuller's earth.

For a further understanding of the invention and the advantages afforded thereby, illustrative examples are set forth and these are not to be taken as limitative of the invention. Unless specified, all parts given are by weight.

EXAMPLE 1

Ten milligrams of a test compound are dissolved in five milliliters of acetone and admixed with ten grams of finely ground soil. Acetone therein is permitted to evaporate. One gram of the so-treated soil mixture is added to twenty-five grams of soil contained in 2-ounce narrow-mouth bottles. The soil used for this screening test is a silt loam soil high in organic matter and has exhibited a high active population of nitrifying organisms including Nitrosomonas spp. and Nitrobacter spp. Ten milligrams of nitrogen as ammonium sulfate are dissolved in sufficient water to bring the soil to field capacity moisture and added to the soil. A compound concentration of 10% based on the nitrogen added as ammonium sulfate is attained. The bottles are next covered with plastic caps containing a small hole for aeration purposes and they are then incubated at 75° F.–80° F.

A number of samples are prepared so as to allow for the determination of nitrites and nitrates every two weeks over an eight-week period. After the required incubation, samples are removed to be analyzed for nitrites and nitrates therein employing microanalytical techniques.

The percent of nitrification of the ammonium sulfate added to the soil after the various intervals of incubation is presented in Table I below.

TABLE I.—THE PERCENT OF NITRIFICATION OF THE ADDED AMMONIUM SULFATE AFTER THE VARIOUS INTERVALS OF INCUBATION

| Soil treatment | Percent of Nitrification after days of Incubation | | | |
|---|---|---|---|---|
| | 14 | 28 | 42 | 56 |
| Ammonium sulfate (control) | 100 | 100 | 100 | 100 |
| Ammonium sulfate plus 2,4-diamino-6-trichloromethyl-s-triazine | 0 | 0 | 0 | 0 |
| Ammonium sulfate plus 2-amino-4,6-bis(trichloromethyl)-s-triazine | 0 | 0 | 50 | 55 |
| Ammonium sulfate plus 2-methyl-4,6-bis(trichloromethyl)-s-triazine | 0 | 10 | 50 | 75 |
| Ammonium sulfate plus 2-ethyl-4,6-bis(trichloromethyl)-s-triazine | 25 | 25 | 25 | 25 |
| Ammonium sulfate plus 2,4-diethyl-6-trichloromethyl-s-triazine | 0 | 25 | 25 | 20 |
| Ammonium sulfate plus 2,4,6-tris-trichloromethyl-s-triazine | 0 | 0 | 0 | 0 |
| Ammonium sulfate plus 2,4,6-tris-tribromomethyl-s-triazine | 25 | 25 | 50 | 100 |
| Ammonium sulfate plus 2-methyl-4,6-bis(tribromomethyl)-s-triazine | 25 | 25 | 100 | 100 |
| Ammonium sulfate plus 2-methoxy-4,6-bis(tribromomethyl)-s-triazine | 0 | 50 | 100 | 100 |

EXAMPLE 2

In this example, the incubation and extraction procedures of Example 1 above are followed in every detail except that the triazine compounds are evaluated at concentrations of 0.5%, 1.0%, 2.5% and 5%, based on the nitrogen added to the soil as ammonium sulfate. Samples again are removed at two-week intervals over an eight-week incubation period. The nitrite and nitrate extractions and spot-tests are the same as employed in the initial nitrification inhibitor screening.

The percent of nitrification of the ammonium sulfate added to the soil after the various intervals of incubation in representative samples is presented in Table II below.

TABLE II.—THE PERCENT OF NITRIFICATION OF THE ADDED AMMONIUM SULFATE AFTER THE VARIOUS INTERVALS OF INCUBATION

| Soil treatment | Concentration of test compound, percent ratio to nitrogen | Percent of nitrification after—Days of Incubation | | | |
|---|---|---|---|---|---|
| | | 14 | 28 | 42 | 56 |
| Ammonium sulfate (Control) | 0.0 | 100 | 100 | 100 | 100 |
| Ammonium sulfate plus 2,4-diamino-6-trichloro-methyl-s-triazine | 0.5 | 75 | 100 | 100 | 100 |
| Do | 1.0 | 25 | 50 | 100 | 100 |
| Do | 2.5 | 0 | 25 | 50 | 75 |
| Do | 5.0 | 0 | 0 | 0 | 0 |
| Ammonium sulfate plus 2,4-diethyl-6-trichloro-s-triazine | 0.5 | 75 | 100 | 100 | 100 |
| Do | 1.0 | 50 | 100 | 100 | 100 |
| Do | 2.5 | 50 | 50 | 75 | 75 |
| Do | 5.0 | 0 | 0 | 50 | 50 |

I claim:

1. A method of treating soil to suppress nitrification of soil nitrogen therein with the attendant enhancement of plant growth comprising: treating said soil with a nitrification inhibiting amount of a 6-trihalomethyl-s-triazine of the formula:

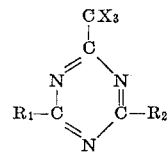

wherein X is halogen and $R_1$ and $R_2$ each represents a member selected from the group consisting of amino, methoxy, methyl, ethyl and trihalomethyl.

2. A method according to claim 1 wherein said s-triazine is 2-amino-4,6-bis(trichloromethyl)-s-triazine.

3. A method according to claim 1 wherein said s-triazine is 2,4,6-tris-trichloromethyl-s-triazine.

4. A method according to claim 1 wherein said s-triazine is 2,4-diamino-6-trichloromethyl-s-triazine.

5. A method of treating soil to suppress nitrification of soil nitrogen therein comprising: treating said soil with a nitrification inhibiting amount of a 6-trihalomethyl-s-triazine of the formula:

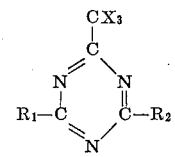

wherein $x$ is a halogen and $R_1$ and $R_2$ each represents a member selected from the group consisting of amino, methyl, ethyl, and trihalomethyl.

6. A fertilizer composition comprising a nitrogen containing fertilizer and a nitrification inhibiting amount of a 6-trihalomethyl-s-triazine compound of the formula:

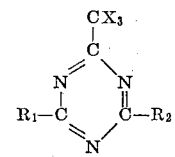

wherein $x$ is halogen and $R_1$ and $R_2$ each represents a member selected from the group consisting of amino, methyl, ethyl, and trihalomethyl.

7. A fertilizer composition comprising a fertilizer containing from about 2% to about 82% nitrogen and a nitrification inhibiting amount of a 6-trihalomethyl-s-triazine compound of the formula:

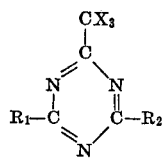

wherein X is halogen and $R_1$ and $R_2$ each represents a member selected from the group consisting of amino, methoxy, methyl, ethyl and trihalomethyl.

8. A fertilizer composition comprising from about 2% to about 82% nitrogen and a 6-trihalomethyl-s-triazine nitrification inhibitor of the formula:

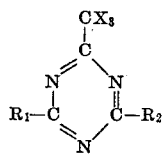

wherein X is halogen and $R_1$ and $R_2$ each represents a member selected from the group consisting of amino, methyl, ethyl, methoxy and trihalomethyl, said inhibitor percentage being present in nitrification inhibiting amounts ranging from about 0.5% to about 10%, based on the weight of the nitrogen contained in said fertilizer.

9. A composition according to claim 8 wherein said nitrification inhibitor is 2,4-diamino-6-trichloromethyl-s-triazine.

10. A composition according to claim 8 wherein said nitrification inhibitor is 2 - amino - 4,6 - bis(trichloromethyl)-s-triazine.

11. A composition according to claim 8 wherein said nitrification inhibitor is 2,4,6 - tris-trichloromethyl-s-triazine.

12. A composition according to claim 8 wherein said nitrification inhibitor is 2 - methyl - 4,6 - bis(trichloromethyl)-s-triazine.

References Cited
UNITED STATES PATENTS

| | | | |
|---|---|---|---|
| 2,880,207 | 3/1959 | Schroeder et al. | 260—248 |
| 3,040,044 | 6/1962 | Hirsch et al. | 260—248 |
| 3,203,550 | 8/1965 | Schaefer | 260—248 |
| 3,284,188 | 11/1966 | Amagasa et al. | 71—27 X |
| 3,305,348 | 2/1967 | Schwarze et al. | 71—93 |

S. LEON BASHORE, Primary Examiner

E. R. FREEDMAN, Assistant Examiner

U.S. Cl. X.R.

71—28, 54; 260—248